Patented June 19, 1951

2,557,913

UNITED STATES PATENT OFFICE 2,557,913

PRODUCTION OF METHIONINE

John E. Livak, Clemson, S. C., and Edgar C. Britton, Midland, Mich., assignors to The Dow Chemical Company, Midland, Mich., a corporation of Delaware No Drawing. Application November 7, 1946, Serial No. 708,466

12 Claims. (Cl. 260—309.5)

This invention concerns a new method for the synthesis of dl-methionine.

According to the invention dl-methionine is produced by reacting methylmercaptan with acrolein to form beta-methylmercapto-propionaldehyde, reacting the latter with an aqueous solution of ammonium carbonate and an ionizable inorganic cyanide to form 5-(beta-methylmercaptoethyl) hydantoin and hydrolyzing the 5-(beta-methylmercaptoethyl) hydantoin to form methionine. This combination of reactions constitutes a new synthesis of methionine which permits convenient and economic manufacture of the latter from readily available starting materials.

It may be mentioned that the second of the above-mentioned reactions, i. e. to form 5-(beta-methylmercaptoethyl) hydantoin, is subject matter of a copending application of J. E. Livak et al., Serial No. 708,465, filed concurrently herewith.

It is known that methylmercaptan an acrolein, upon being admixed, react sluggishly to form beta - methylmercapto - propionaldehyde in low yield, and that the reaction can be catalyzed by adding a minor amount of a mercuric salt. In a copending application of J. C. Vander Weele, Serial No. 708,464, filed concurrently herewith, now U. S. Patent 2,521,677, it is disclosed that organic peroxides such as diacetyl peroxide, dilauroyl peroxide, or dibenzoyl peroxide, etc., particularly diacetyl peroxide, are especially effective as catalysts for the reaction, but that when using such peroxide catalyst, it is important that the reaction be carried out at atmospheric pressure or thereabout, e. g. at absolute pressures of from 0.5 to 1.5 atmospheres, and at temperatures below 50° C., and preferably between —5° and 20° C.

The reaction of methylmercaptan with acrolein to form beta-methylmercapto-propionaldehyde is advantageously carried out by dissolving a minor amount, e. g. from 0.1 to 1.5 per cent by weight, of an organic peroxide, preferably diacetyl peroxide, in acrolein and passing methylmercaptan into the mixture while cooling the latter to maintain it at temperatures below 30° C., and continuing introduction of the methylmercaptan until the density of the mixture has increased to a value of from 1.025 to 1.05 at 15° C. During the reaction it may be necessary to add minor amounts of organic peroxide from time to time, since the peroxide tends to decompose during use as a catalyst for the reaction. The peroxide is preferably used in amount such as to permit continuance of the reaction until approximately one molecular equivalent of methylmercaptan is consumed per mole of the acrolein starting material, but such as to be substantially decomposed when the reaction has progressed to this point. In case an appreciable amount of peroxide remains in the reacted mixture, it may be decomposed by adding a minor amount of an alkali such as sodium or potassium carbonate and warming the mixture. The beta-methylmercapto-propionaldehyde product may then be separated by fractional distillation.

The compound, 5-(beta-methylmercaptoethyl) hydantoin, is prepared by admixing beta-methylmercapto-propionaldehyde with an aqueous solution of ammonium carbonate and an ionizable inorganic cyanide, e. g. NaCN, KCN, or $Ca(CN)_2$, etc., and heating the mixture at atmospheric or superatmospheric pressure to reaction temperature, e. g. of from 40° to 120° C., and preferably from 60° to 90° C. The ammonium carbonate or inorganic cyanide reactants are preferably employed in amounts as great as are theoretically required for reaction with the aldehyde to form 5-(beta-methylmercaptoethyl) hydantoin, but either of said reactants may be used in somewhat smaller or in considerably larger proportions, if desired. When employing an alkali metal cyanide and ammonium carbonate in the absence of other ammonium salt reactants, the proportions thereof theoretically required by the reaction are one molecular equivalent of the cyanide and three chemical equivalents, i. e. 1.5 molecular equivalents, of ammonium carbonate per mole of the beta-methylmercapto-propionaldehyde. When a cyanide of calcium, or other metal capable of forming an insoluble carbonate, is used as a reactant, a correspondingly greater proportion of ammonium carbonate is required due to consumption of a portion of the latter in forming the insoluble carbonate.

We have found that a water-soluble ammonium salt other than ammonium carbonate may advantageously be employed together with, or in place of a portion of, the ammonium carbonate in the reaction to form 5-(beta-methylmercaptoethyl) hydantoin, provided a total of at least 3 chemical equivalents of the ammonium salt mixture, including at least one molecular equivalent of ammonium carbonate, are employed per mole of the beta-methylmercapto-propionaldehyde reactant. Examples of ammonium salts which may thus be used together with the ammonium carbonate are ammonium chloride, ammonium bromide, ammonium sulphate, or ammonium acetate, etc. Use of the mixture of ammonium carbonate and another ammonium salt in the reaction usually results in an appreciable increase in yield of 5-(beta-methylmercaptoethyl) hydantoin over that obtainable when employing ammonium carbonate as the only ammonium salt reactant under otherwise similar reaction conditions. The time required to carry out the heating for formation of the 5-(beta-methylmercaptoethyl) hydantoin varies from about 20 minutes to several hours depending upon the reaction temperature employed. The reaction occurs more rapidly, of course, with raise in the temperature.

After heating the aqueous mixture of beta-methylmercapto-propionaldehyde, inorganic cyanide and one or more ammonium salts, including ammonium carbonate, at reaction temperatures between 40° and 120° C. as just described, the mixture may be acidified and cooled to crystallize the 5 - (beta - methylmercaptoethyl) hydantoin product and obtain it in good yield. However, we have found that the yield can be increased considerably by treating the mixture with a strong mineral acid, such as HCl, HBr, or $H_2SO_4$, etc., in amount sufficient to bring the mixture to a pH value of less than 4 and heating the acidified mixture at temperatures of from 50° to 100° C., e. g. for one-half hour or longer, prior to separating the 5-(beta-methylmercaptoethyl) hydantoin. During acidification of the mixture, hydrogen cyanide usually is evolved and care should be taken to avoid inhaling the vapors, e. g. the acidification is preferably accomplished in a well-ventilated hood. Apparently the operations of rendering the mixture strongly acidic and heating it while in acidified condition, result in conversion of intermediate by-products into the 5-(beta-methylmercaptoethyl) hydantoin with consequent increase in the yield of the latter.

The 5-(beta-methylmercaptoethyl) hydantoin may be hydrolyzed by heating the same together with an aqueous solution of any alkali such as $Na_2CO_3$, $K_2CO_3$, NaOH, or KOH, etc. However, such hydrolysis with most alkalies results in excessive by-product formation and in production of methionine in a low yield or in discolored form. In a copending application of J. E. Livak et al., Serial No. 708,469, filed concurrently herewith, now U. S. Patent 2,527,366, it is shown that under certain reaction conditions barium hydroxide is particularly effective as an agent for the hydrolysis of substituted hydantoins to break the hydantoin ring with formation of a corresponding amino acid. Barium hydroxide is preferred as an agent for the hydrolysis of the 5-(beta-methylmercaptoethyl) hydantoin to form methionine.

The hydrolysis is preferably accomplished by admixing the 5-(beta-methylmercaptoethyl) hydantoin with 1.5 molecular equivalents or more of barium hydroxide and sufficient water to dissolve the major portion of the barium hydroxide and heating the mixture in a bomb or autoclave at temperatures of from 115° to 210° C. Air is preferably swept from the reactor with nitrogen, steam, or other inert gas prior to heating the mixture under pressure since oxygen, if present during the reaction, sometimes causes by-product formation. The hydrolysis occurs rapidly and is usually complete after from 1 to 45 minutes of heating, particularly when carried out at temperatures of from 150° to 210° C. The products formed by the hydrolysis comprise insoluble barium carbonate, ammonia, and a soluble barium salt of methionine. The barium methionate may, of course, be separated and recovered as such, but due to the fact that barium salts are toxic, it is important, for medicinal uses, that the methionine be recovered either in free form or as a substantially non-toxic salt thereof.

The barium present as a soluble salt of the methionine may be precipitated as an insoluble salt, e. g. as barium sulphate or carbonate by adding a water-soluble sulphate or carbonate to the hydrolysis mixture. Examples of soluble sulphates and carbonates which may be employed to precipitate the barium are sulphuric acid, sodium sulphate, potassium sulphate, ammonium sulphate, ammonium acid sulphate, carbon dioxide, sodium carbonate, sodium bicarbonate, potassium carbonate, ammonium carbonate, or ammonium bicarbonate, etc. When an alkali metal sulphate or alkali metal carbonate is used to precipitate the barium, there remains in solution a corresponding alkali metal salt of the methionine which, after removal of the precipitated inorganic barium salt, may be recovered by evaporation of the liquor and crystallization from the concentrated liquor.

When sulphuric acid, or carbon dioxide is used to precipitate the barium, methionine in free form remains dissolved in the liquor. When an ammonium sulphate or carbonate is employed to precipitate the barium, there is formed, of course, a water-soluble ammonium salt of methionine. However, the ammonium salt is readily decomposed to form free methionine and evolve ammonia during subsequent operations of heating the liquor to concentrate the same, so that methionine in free form is the ultimate product.

In practice the soluble barium in the hydrolysis mixture is preferably precipitated by treating the mixture with carbon dioxide or an ammonium carbonate. The precipitate of barium carbonate is removed, e. g. by filtration, and the liquor is evaporated, preferably by heating the same under vacuum, to crystallize the methionine product. The evaporation may be carried substantially to dryness in a single step so as to obtain the methionine as a residue, or the evaporation may be carried out in stepwise manner with alternate cooling operations to crystallize successive crops of the methionine. Such stepwise evaporation and crystallization operations usually result in direct recovery of the major portion of the methionine in a form of high purity. However, the last of such successive crops of product, or the product as obtained by a single-step evaporation of the liquor to dryness, may be discolored or somewhat impure. It may be purified by recrystallization from water or an aqueous solution of a lower alcohol such as methanol, ethanol, or propanol, etc.

The following examples describe certain ways in which the principle of the invention has been applied, but are not to be construed as limiting its scope.

EXAMPLE 1

*Preparation of beta-methylmercapto-propionaldehyde*

Methylmercaptan was passed into a solution of 74 grams of freshly-distilled acrolein and 0.3 gram of diacetyl peroxide until the density of the mixture had increased to a value of 1.050 at 15° C. During introduction of the methylmercaptan, the mixture was maintained at temperatures between 10° and 15° C. by external cooling of the reaction vessel. Also, 0.9 gram of diacetyl peroxide was added in small portions while introducing the methylmercaptan. After completing the reaction, the mixture was fractionally distilled under vacuum. There were obtained 3 grams of methylmercaptan, 1.5 grams of acrolein, 3 grams of an intermediate fraction, 116 grams of beta-methylmercapto-propionaldehyde and 7.5 grams of residual higher boiling material. The yield of beta-methylmercapto-propionaldehyde was approximately 86 per cent of theoretical, based on the acrolein consumed.

EXAMPLE 2

*Preparation of 5-(beta-methylmercaptoethyl) hydantoin*

A solution of 34.2 grams (0.3 mole) of ammonium carbonate monohydrate, 10.8 grams (0.22 mole) of sodium cyanide, and 20.8 grams (0.2 mole) of beta-methylmercapto-propionaldehyde in 250 cubic centimeters of water was heated with stirring at a temperature of 80° C. for 1.5 hours. The mixture was then cooled to 60° C. and treated in a well-ventilated hood with 120 cubic centimeters of a concentrated aqueous hydrochloric acid solution of approximately 11.6 normality. The acidified mixture was heated with stirring at a temperature of 85° C. for 1.5 hours. It was then cooled to approximately 5° C. and filtered, whereby 25.5 grams of 5-(beta-methylmercaptoethyl) hydantoin was obtained as a residue. The filtrate was evaporated under vacuum, i. e. at 100 millimeters' absolute pressure, to dryness. The residue was extracted with acetone and the extract was filtered. The acetone was then vaporized from the extract and the 5-(beta-methylmercaptoethyl) hydantoin obtained as the residue was purified by recrystallization from water. The total yield of 5-(beta-methylmercaptoethyl) hydantoin was 31.5 grams, or 90.5 per cent of theoretical. The product had a melting point of 104°–106° C.

EXAMPLE 3

*Reaction to form methionine*

A mixture of 8.7 grams (0.05 mole) of 5-(beta-methylmercaptoethyl) hydantoin, 25.3 grams (0.08 mole) of Ba(OH)$_2$.8H$_2$O, and 300 cubic centimeters of water was heated with agitation in an autoclave at a temperature of 155° C. for 15 minutes. The mixture was then cooled to 80° C., the autoclave opened, and a solution of 4.6 grams (0.04 mole) of ammonium carbonate monohydrate in 35 cubic centimeters of water was added. Barium carbonate was thereby precipitated. The barium carbonate was removed by filtration and the filtrate was evaporated to dryness under vacuum. The residue was slurried with ethyl alcohol and filtered. As the residue from this second filtration, there was obtained 7.1 grams, or 95 per cent of the theoretical yield, of dl-methionine.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of making methionine, the steps of admixing one molecular equivalent of beta-methylmercapto-propionaldehyde with an aqueous solution containing at least one chemical equivalent of an ionizable inorganic cyanide and at least 3 chemical equivalents of inorganic ammonium salt, including at least one molecular equivalent of ammonium carbonate, heating the mixture at temperatures between 40° and 120° C., acidifying the resultant mixture to bring it to a pH value of less than 4, separating the 5-(beta-methylmercaptoethyl) hydantoin which is formed, and hydrolyzing the latter by heating the same together with an aqueous solution of an alkali at superatmospheric pressure to a reaction temperature between 115°–210° C.

2. The process for preparing methionine which comprises heating beta-methyl-mercapto-propionaldehyde with an alkali metal cyanide and ammonium carbonate in an aqueous medium to form methionine hydantoin and hydrolyzing said methionine hydantoin to methionine by heating it in an alkaline aqueous medium.

3. A method of making a compound having the general formula:

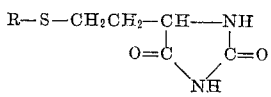

wherein R represents a lower alkyl radical, which method comprises reacting a corresponding beta-alkylmercapto-propionaldehyde with an aqueous solution of ammonium carbonate and an ionizable inorganic cyanide and thereafter acidifying the mixture.

4. In a method of making a compound having the general formula:

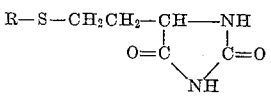

wherein R represents a lower alkyl radical, the steps of heating an aqueous mixture of one molecular equivalent of a corresponding beta-alkylmercapto-propionaldehyde, at least one molecular equivalent of an alkali metal cyanide, and at least three chemical equivalents of inorganic ammonium salt, including at least one molecular equivalent of ammonium carbonate, to a reaction temperature between 40° and 120° C., thereafter acidifying the mixture and crystallizing and separating the resultant 5-(alkylmercaptoethyl) hydantoin product.

5. In a method of making a compound having the general formula:

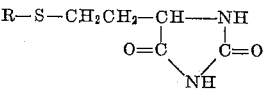

wherein R represents a lower alkyl radical, the steps of heating an aqueous solution of one molecular equivalent of a corresponding beta-alkylmercapto-propionaldehyde, at least one mole of an alkali metal cyanide, at least one mole of ammonium carbonate and at least one chemical equivalent of another inorganic ammonium salt to a reaction temperature between 60° and 90° C., thereafter treating the mixture with a mineral acid in amount sufficient to bring the mixture to a pH value of less than 4, heating the mixture at temperatures between 60° and 90° C., and crystallizing and separating the resultant 5-(beta-alkylmercaptoethyl) hydantoin product.

6. A method, as described in claim 4, wherein the aldehyde reactant is beta-methylmercapto-propionaldehyde and the reaction product is 5-(beta-methylmercaptoethyl) hydantoin.

7. A method, as described in claim 5, wherein the aldehyde reactant is beta-methylmercapto-propionaldehyde, the mineral acid used to acidify the reaction mixture is hydrochloric acid, and the reaction product is 5-(beta-methylmercaptoethyl) hydantoin.

8. In a method of making methionine, the steps of admixing one molecular equivalent of beta-methylmercaptopropionaldehyde with an aqueous solution containing at least one chemical equivalent of an ionizable inorganic cyanide and at least 3 chemical equivalents of inorganic ammonium salt, including at least one molecular equivalent of ammonium carbonate, heating the mixture at temperatures between 40° and 120° C., acidifying the resultant mixture to bring it to a pH value of less than 4, heating the acidified mixture at temperatures between 50° and 100° C., separating the 5-(beta-methylmercaptoethyl) hydantoin which is formed, and hydrolyzing the latter by heating the same together with an aqueous solution of an alkali at super-atmospheric pressure to a reaction temperature between 115° and 210° C.

9. The process for preparing methionine hydantoin which comprises heating beta-methylmercaptopropionaldehyde with an alkali metal cyanide and ammonium carbonate in an aqueous medium, acidifying the reaction mixture and then crystallizing and separating methionine hydantoin therefrom.

10. The process for preparing methionine hydantoin which comprises heating beta-methylmercaptopropionaldehyde with an ionizable inorganic cyanide and ammonium carbonate in an aqueous medium, acidifying the reaction mixture and then crystallizing and separating methionine hydantoin therefrom.

11. The process for preparing methionine hydantoin which comprises heating, at a reaction temperature above 50° C., beta-methylmercaptopropionaldehyde with an alkali metal cyanide and ammonium carbonate in an aqueous medium, then acidifying the reaction mixture, further heating the mixture at a reaction temperature above 50° C., and thereafter crystallizing and separating methionine hydantoin from the mixture.

12. In the method of making 5-(methylmercaptoethyl) hydantoin, the steps of heating an aqueous mixture of one molecular equivalent of beta-methylmercaptopropionaldehyde, at least one molecular equivalent of an alkali metal cyanide, and at least three chemical equivalents of ammonium carbonate, to a reaction temperature between 40° and 80° C., thereafter acidifying the mixture and crystallizing and separating the resultant 5-(methylmercaptoethyl) hydantoin.

JOHN E. LIVAK.
EDGAR C. BRITTON.

REFERENCES CITED

The following references are of record in the file of this patent:

FOREIGN PATENTS

| Number | Country | Date |
| --- | --- | --- |
| 566,094 | Germany | Dec. 14, 1932 |

OTHER REFERENCES

Urech: "Liebig's Annalen," vol. 164 (1872), pp. 264–271.

Heintz: "Liebig's Annalen," vol. 169 (1873), pp. 125–127.

Pinner et al.: "Ber. Deut. Chem.," vol. 22, (1889), pp. 695–696.

Barger et al.: "Biochem. Journal," vol. 22 (1928), pp. 1420–1421.

Bucherer: "Jour. Prak. Chem.," vol. 141 (1934), p. 25, pp. 5–43.

Bucherer et al.: "J. Prak. Chem.," vol. 140 (1934), pp. 291–316.

Boyd et al.: "Biochem. Journal," vol. 29 (1935), p. 553.

Kaneko: "Chemical Abstracts," vol. 33 (1939), p. 2106 (Abstract of J. Chem. Soc., Japan, vol. 59 (1938), pp. 1382–1384).

Rothstein: "Jour. Chem. Soc." (London), 1940, p. 1562.

Houben: "Die methoden de Organischen Chemie," 3rd edition, 1941, vol. 4, page 742.